United States Patent
Ugokwe

(10) Patent No.: US 8,082,435 B2
(45) Date of Patent: Dec. 20, 2011

(54) MEMORY DEVICE INITIATE AND TERMINATE BOOT COMMANDS

(75) Inventor: Uche Ugokwe, Hayward, CA (US)

(73) Assignee: Micron Technology, Inc., Boise, ID (US)

(*) Notice: Subject to any disclaimer, the term of this patent is extended or adjusted under 35 U.S.C. 154(b) by 665 days.

(21) Appl. No.: 12/116,325

(22) Filed: May 7, 2008

(65) Prior Publication Data

US 2009/0282232 A1    Nov. 12, 2009

(51) Int. Cl.
*G06F 15/177* (2006.01)
(52) U.S. Cl. .................. 713/2; 710/14; 711/103
(58) Field of Classification Search ........ 713/2; 710/14; 711/103
See application file for complete search history.

(56) References Cited

U.S. PATENT DOCUMENTS 7,383,362 B2 * 6/2008 Yu et al. .................... 710/22
7,739,487 B2 * 6/2010 Mylly et al. ................ 713/1

OTHER PUBLICATIONS

Micron Technology, Inc, Technical Note TN-29-18: Booting form Embedded MMC, Rev. B, Oct. 2007.*
JEDEC Solid State Technology Association Embedded MultiMediaCard (eMMC) eMMC/Card Product Standard, High Capacity, including Reliable Write, Boot, and Sleep Modes (MMCA, 4.3), JESD84-A43, Nov. 2007, pp. 21-75 and 147-148.

* cited by examiner

*Primary Examiner* — Albert Wang
(74) *Attorney, Agent, or Firm* — Leffert Jay & Polglaze, P.A.

(57) ABSTRACT

Memory devices and methods facilitate initiation and termination of boot data output from a memory device through the use of received commands. For example, boot data output is initiated in response to a command indicative of a desire to enter a boot mode of operation. The initiate boot command may include a base command and a unique argument indicative of a desire to enter the boot mode of operation. Boot data output may be terminated by a received command indicative of a desire to terminate the boot mode of operation. The terminate boot command may include the same base command as the initiate boot command with any argument other than the argument indicative of a desire to enter the boot mode of operation.

24 Claims, 4 Drawing Sheets

MEMORY DEVICE INITIATE AND TERMINATE BOOT COMMANDS

TECHNICAL FIELD

The present disclosure relates generally to memory devices and in particular the present disclosure relates to methods and apparatus for accessing boot data stored in a memory device.

BACKGROUND

Memory devices are typically provided as internal, semiconductor, integrated circuits in computers or other electronic devices. There are many different types of memory including random-access memory (RAM), read only memory (ROM), dynamic random access memory (DRAM), synchronous dynamic random access memory (SDRAM), and flash memory.

Flash memory devices have developed into a popular source of non-volatile memory for a wide range of electronic applications. Non-volatile memory is memory that can retain its stored data for some extended period without the application of power. Common uses for flash memory and other non-volatile memory include personal computers, personal digital assistants (PDAs), digital cameras, digital media players, digital recorders, games, appliances, vehicles, wireless devices, mobile telephones and removable memory modules, and the uses for non-volatile memory continue to expand.

Flash memory devices typically use a one-transistor memory cell that allows for high memory densities, high reliability, and low power consumption. Storing data in a flash memory cell can be accomplished by changing the threshold voltage of the cell, through programming or "writing" of charge storage nodes, such as floating gates or trapping layers or other physical phenomena. By defining two or more ranges of threshold voltages to correspond to individual data states, one or more bits of information may be stored on each cell. Examples are single level and multilevel memory cells.

Flash memory typically utilizes one of two basic architectures known as NOR flash and NAND flash. The designation is derived from the logic used to read the devices. In NOR flash architecture, a column of memory cells are coupled in parallel with each memory cell coupled to a transfer line, often referred to as a bit line. In NAND flash architecture, a column (e.g., NAND string) of memory cells are coupled in series with only the first memory cell of the column coupled to a bit line.

In many modern flash memory device implementations, the host interface and erase block management routines additionally allow for the flash memory device to appear as a read/write mass storage device (e.g., a magnetic disk) to the host. One such approach is to conform the interface to the flash memory to a standard interface for a conventional magnetic hard disk drive allowing the flash memory device to appear as a block read/write mass storage device or disk. This approach has been codified by the Personal Computer Memory Card International Association (PCMCIA), Compact Flash (CF) and Multimedia Card (MMC) standardization committees, which have each promulgated a standard for supporting flash memory systems, which are sometimes referred to as flash memory "cards", which can emulate a hard disk drive protocol. Other such protocols exist as are known to those skilled in that art.

A typical operation performed by a host (e.g., processor) is to boot load upon power-up or a reset of the host system. This boot operation typically involves loading boot (e.g., system initialization) data from a memory device coupled to the host. In some systems, this operation is set in motion by applying a continuous clock signal and driving an input of a memory device storing the boot data to a fixed state (e.g., logic level 0 or 1) for a particular number of clock cycles. In such a system, the signal being driven to the fixed state for the required amount of time along with the applied clock signal are interpreted by the memory device as an indication to output boot data. One issue that can result from this method is that noise may appear on the signal and might be interpreted as an indication to terminate the boot operation when it was not intended. This would result in a failed boot load attempt. Another issue is that some hosts may not be configured to drive the signal to a fixed state for the required amount of time. Thus, some memory devices may require a hardware change to be able to utilize the boot method described above.

Thus, for the reasons stated above, and for other reasons that will become apparent to those skilled in the art upon reading and understanding the present specification, there is a need in the art for additional and more robust methods of performing boot operations with a host coupled to one or more memory devices.

DETAILED DESCRIPTION

In the following detailed description of the present embodiments, reference is made to the accompanying drawings that form a part hereof, and in which is shown by way of illustration specific embodiments in which the disclosure may be practiced. These embodiments are described in sufficient detail to enable those skilled in the art to practice the embodiments of the invention, and it is to be understood that other embodiments may be utilized and that electrical, mechanical or process changes may be made without departing from the present disclosure. The following detailed description is, therefore, not to be taken in a limiting sense.

Figure 1:
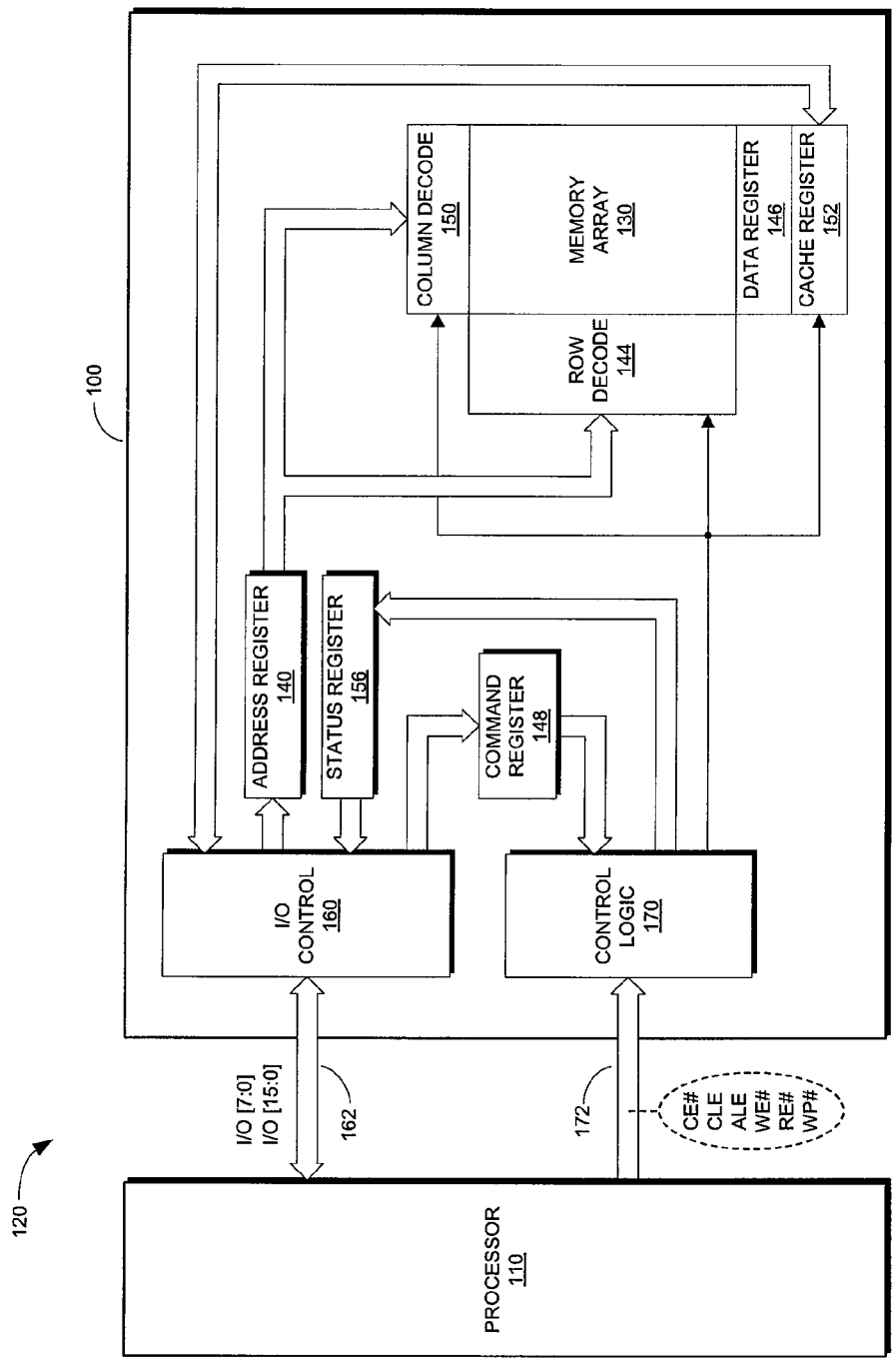
FIG. 1 is a functional block diagram of an electronic system having at least one memory device according to an embodiment of the present disclosure.

FIG. 1 is a functional block diagram of an electronic system according to one or more embodiments of the present disclosure. The memory device 100 is coupled to a processor 110. The processor 110 can be a microprocessor or some other type of controlling circuitry. The memory device 100 and the processor 110 form part of the electronic system 120. The memory device 100 has been simplified to focus on features of the memory that are helpful in understanding the embodiments of the present disclosure.

The memory device 100 includes an array of memory cells 130 that can be arranged in banks of rows and columns. For example, the memory array can be an array of flash memory cells arranged in a NAND or NOR configuration.

Row decode circuitry 144 and column decode circuitry 150 are provided to decode address signals. Address signals are received and decoded to access memory array 130. Memory device 100 also includes input/output (I/O) control circuitry 160 to manage input of commands, addresses and data to the memory device 100 as well as output of data and status information from the memory device 100. An address register 140 is coupled between I/O control circuitry 160, row decode circuitry 144 and column decode circuitry 150 to latch the address signals prior to decoding. A command register 148 is coupled between I/O control circuitry 160 and control logic 170 to latch incoming commands. Control logic 170 controls access to the memory array 130 in response to the commands and generates status information for the external processor 110. The control logic 170 is coupled to row decode circuitry 144 and column decode circuitry 150 to control the row decode circuitry 144 and column decode circuitry 150 in response to the addresses. Control logic 170 also comprises in part, various structures and circuits in order to facilitate implementation of the various embodiments of the present disclosure. For example, control logic 170 can include a state machine and/or various logic circuits and control registers. The memory device 100 is configured to initiate a boot operating mode in accordance with one or more embodiments of the disclosure.

Control logic 170 is also coupled to a cache register 152. Cache register 152 latches data, either incoming or outgoing, as directed by control logic 170 to temporarily store data while the memory array 130 is busy writing or reading, respectively, other data. During a write operation, data is passed from the cache register 152 to data register 146 for transfer to the memory array 130; then new data is latched in the cache register 152 from the I/O control circuitry 160. During a read operation, data is passed from the cache register 152 to the I/O control circuitry 160 for output to the external processor 110; then new data is passed from the data register 146 to the cache register 152. A status register 156 is coupled between I/O control circuitry 160 and control logic 170 to latch the status information for output to the processor 110.

Memory device 100 receives control signals at control logic 170 from processor 110 over a control link 172. The control signals present on the control link 172 may include a chip enable CE#, a command latch enable CLE, an address latch enable ALE, a write enable WE#, a read enable RE# and a write protect WP# signal. Memory device 100 receives commands (in the form of command signals), addresses (in the form of address signals), and data (in the form of data signals) from processor 110 over a multiplexed input/output (I/O) bus 162 and outputs data to processor 110 over I/O bus 162.

Specifically, the commands are received over input/output (I/O) pins [7:0] of I/O bus 162 at I/O control circuitry 160 and are written into command register 148. The addresses are received over input/output (I/O) pins [7:0] of bus 162 at I/O control circuitry 160 and are written into address register 140. The data are received over input/output (I/O) pins [7:0] for an 8-bit device or input/output (I/O) pins [15:0] for a 16-bit device at I/O control circuitry 160 and are written into cache register 152. The data are subsequently written into data register 146 for programming memory array 130. For another embodiment, cache register 152 may be omitted, and the data are written directly into data register 146. Data are also output over input/output (I/O) pins [7:0] for an 8-bit device or input/output (I/O) pins [15:0] for a 16-bit device. It will be appreciated by those skilled in the art that additional circuitry and signals (e.g., system clock) can be provided, and that the memory device of FIG. 1 has been simplified to help focus on the present disclosure. Additionally, while the memory device of FIG. 1 has been described in accordance with popular conventions for receipt and output of the various signals, it is noted that the various embodiments are not limited by the specific signals and I/O configurations described unless expressly noted herein.

Figure 2:
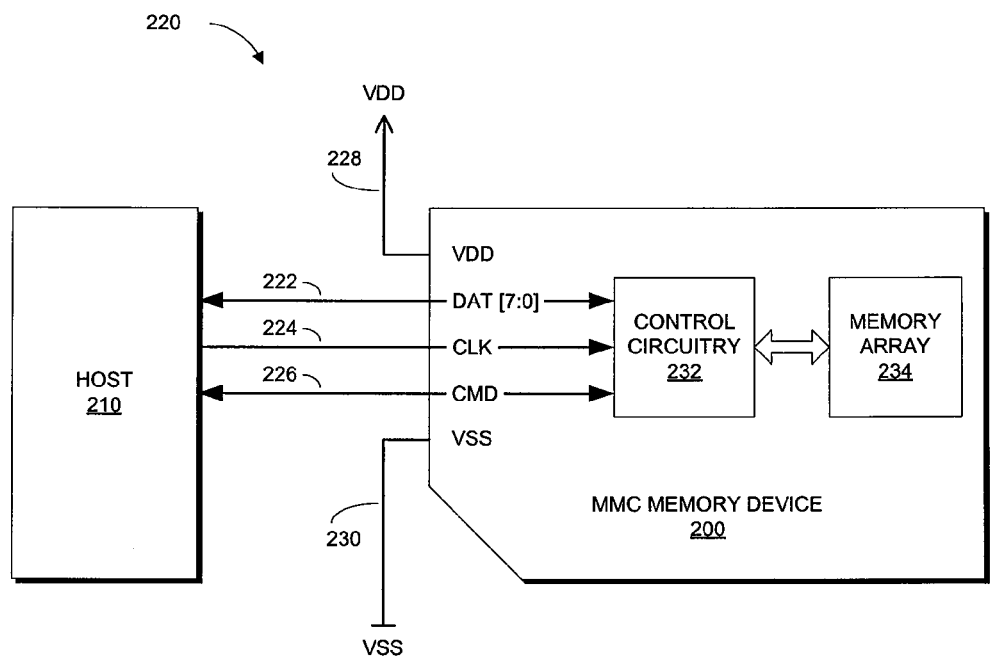
FIG. 2 is a functional block diagram of an electronic system having at least one MMC memory device according to an embodiment of the present disclosure.

One such type of memory device 100 is an MMC type memory device. FIG. 2 illustrates a system according to an embodiment of the present disclosure utilizing an MMC memory device. As with the system illustrated in FIG. 1, FIG. 2 has been simplified to focus on features of the system that are helpful in understanding the present disclosure. Other circuitry and functionality including that illustrated in FIG. 1 can be present in the system shown in FIG. 2 as is known to those skilled in the art. The system 220 shown in FIG. 2 comprises a host 210 and an MMC memory device 200. For example, the host 210 may be a processor or other type of controller external to the MMC memory device 200. The clock (CLK) signal 224 may be generated by the host 210 as shown or may be generated by some other clock source separate from the host 210. MMC commands are transferred between the host 210 and the MMC memory device by a serial bidirectional command (CMD) signal 226. Data is transferred between the host 210 and memory device 200 by a bidirectional data bus 222. Although data bus 222 is shown in FIG. 2 as an 8-bit (DAT [7:0]) data bus, other data bus widths are possible according to various embodiments of the present disclosure. Power connections for VDD 228 and VSS 230 are also shown. The memory device 200 is not limited to the signals illustrated in FIG. 2. For example, additional power/ground and communication signals may be present between the memory device 200 and the host 210. Control circuitry 232 serves to control the operation of the memory device according to the embodiments of the present disclosure and is illustrated in a simplified form. The control circuitry can include a state machine and/or various logic circuits and control registers. These control registers can comprise configuration registers storing bits which indicate a number of possible configurations for the memory device. Control circuitry 232 can also include one or more of the functional blocks (e.g., 140, 144, 146, 148, 150, 152, 156, 160, 170) illustrated in FIG. 1. Additional analog and/or digital circuitry to facilitate implementation of the various embodiments of the present disclosure can also be included in control circuitry 232.

MMC memory devices can be Read Only devices or can also be Read/Write devices. Read Only devices are pre-programmed, typically by a vendor or manufacturer and generally cannot be written to in routine operation. Read/Write devices may be written to one or more times. For example, memory array 234 can be an array of flash memory cells which can be programmed many times. MMC memory devices 200 may also contain one time programmable memory that allows the memory to be programmed one time by a user.

Figure 3:
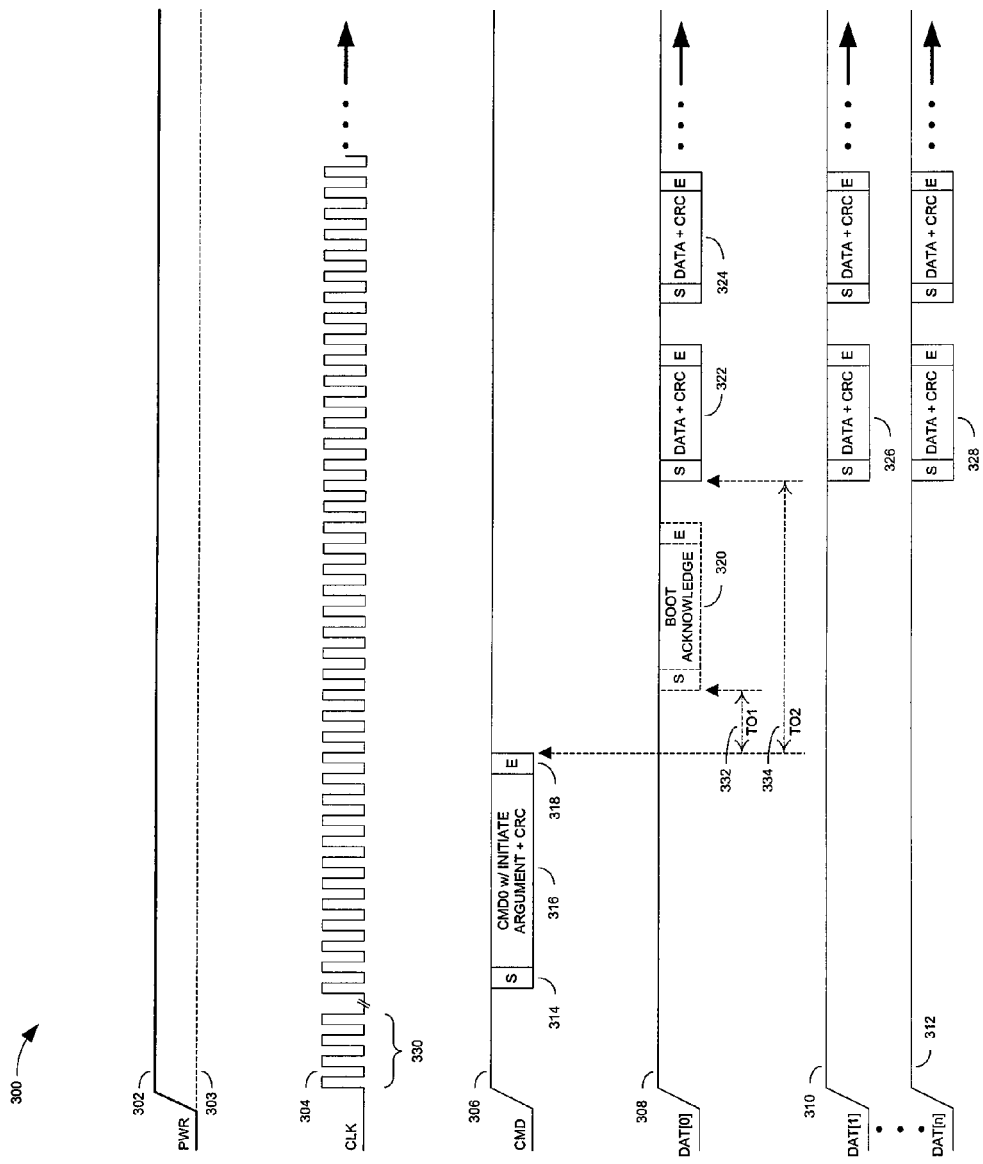
FIG. 3 is a timing diagram illustrating an initiation of a boot operation according to an embodiment of the disclosure.

FIG. 3 illustrates signal waveforms for a boot operation according to one or more embodiments of the present disclosure such as the system 220 shown in FIG. 2. The uppermost waveform 302 of FIG. 3 represents the application of power to a memory device such as memory device 200. Waveform 302 can be representative of VDD 228 and the dotted line 303 can be representative of VSS 230. For example, VDD can be 2.7 to 3.6 V wherein VSS is substantially equal to a ground potential. However, the embodiments are not limited to these power supply levels as other power supply potentials are known to those skilled in the art.

Waveform 304 represents a clock (CLK) signal 224 (e.g., system clock) supplied to the memory device 200. This clock signal 304 can be generated by a host 210 or may be supplied to the memory device 200 and host 210 by an external clock source (not shown.) According to the embodiment of FIGS. 2 and 3, the clock 224/304 may have a frequency in the range of 0 to 52 MHz. However, the embodiments of the present invention are not limited to a specific fixed or range of clock frequencies. Commands present on the command (CMD) signal line 306 and data presented on the data lines (DAT[7:0]) 308-312 are synchronized with clock signal 304/224.

The command signal 306 is transferred via a bidirectional command line. MMC commands 316 appearing on the command signal line 226/306 are comprised of 48 bits and are each preceded by a start bit 314 and succeeded by an end bit 318. For example, in the embodiments represented by FIGS. 3 and 2, start bits 314 have a logical 0 value wherein end bits 318 have a logical 1 value. Table 1 provides the format for an MMC command. As the command signal 306 is bidirectional, one of the host 210 or the memory device 200 can act as a driver while the other acts as a receiver. A multitude of commands adhering to the format shown in Table 1 are possible according to a standard MMC protocol with regard to one or more of the embodiments of the present disclosure. Other commands are possible as are known in the art. A command in the MMC protocol typically is denoted as a "CMDX" command where 'X' is a number which identifies the actual command. For example, an MMC CMD0 refers to a "GO_IDLE_STATE" which acts as a reset signal for the memory device. For such an embodiment, the desired command is designated by the command (which are sometimes referred to as base bits), e.g., bits 45:40, and the command (sometimes referred to as a base command) may be accompanied by an argument, e.g., bits 39:8, further defining the action of the designated command. In existing MMC devices, the argument (e.g., as shown in Table 1) of a CMD0 command are stuff bits as there is no further definition required by the memory device receiving this command. Another example of an MMC command is a CMD17 ("READ_SINGLE_BLOCK") command wherein the argument comprises the address of the block of data to be read from the memory device 200. Other commands exist in the MMC protocol as are known to those skilled in the art.

TABLE 1

MMC Command Format

| Description | Start Bit | Transmission Bit | Command (Base) | Argument | CRC | End Bit |
|---|---|---|---|---|---|---|
| Bit Position [47:0] | 47 | 46 | [45:40] | [39:8] | [7:1] | 0 |
| Logical Value | 0 | 1 = Host 0 = Memory Device | X | X | X | 1 |

Note:
X = Logical 1 or 0
CRC = Cyclic Redundancy Check

A boot operation in MMC devices can be initiated by the host 210 driving the command line 226 to a low, or logical 0, state for at least 74 clock cycles following power-up of the memory device 200. If intentional or unintentional activity (e.g., noise) occurs on the command line 226 following power-up, other than continuously holding the line low for 74 clock cycles, the memory device 200 is locked out of initiating (e.g., entering) a boot mode until power is cycled on the memory device 200. Termination of the boot operation occurs when the command line is driven to a high (e.g., logical 1) state. Thus, any noise appearing on the command line 226 during a boot operation could be perceived by the memory device 200 as an indication to prematurely terminate the boot operation. This would result in a failed boot load attempt. This MMC boot initiation/termination method may cause issues with some hosts which were not originally designed to accommodate the MMC boot mode described above. For example, some hosts utilize hardware to generate commands which strictly adhere to the command structure shown in Table 1. In such devices, a hardware modification would be required for these hosts to utilize the MMC boot method of driving the CMD signal 226 low for a minimum of 74 clock cycles to initiate a boot mode of operation and further to maintain the low state of the CMD signal 226 throughout the boot operation.

A boot mode of operation in the MMC memory device is different than performing a typical read operation of the memory device. In the MMC example, a read operation involves reading the contents of the memory device from a user (e.g., host) specified address. Before a read operation can occur the MMC device must be transitioned from an identification mode to a transfer mode through a series of handshaking command and response sequences, typically a minimum of 5 steps, but can be more if the device is to be operated with a bus width greater than 1-bit. The boot mode of operation causes the output of boot data to occur without the need for the handshaking sequences and address transfers required of a read operation.

Figure 4:
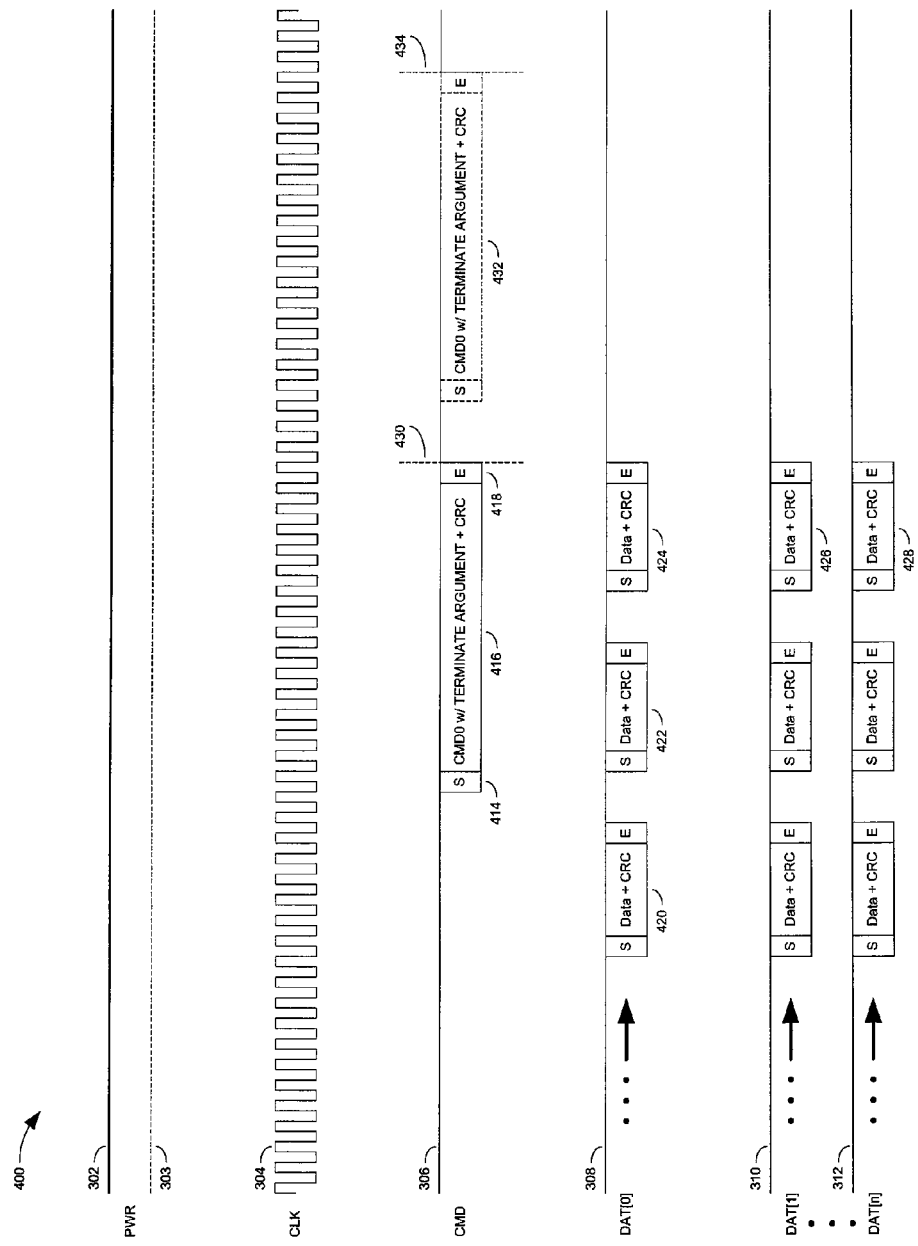
FIG. 4 is a timing diagram illustrating a termination of a boot operation according to an embodiment of the disclosure.

A boot operation according to one or more embodiments of the present disclosure is described by way of reference to the timing diagrams illustrated in FIGS. 3 and 4 and the system shown in FIG. 2. A boot operation according to one or more embodiments of the present disclosure, with reference to an MMC memory device 200 as shown in FIG. 2, should be initiated after the power supply for the memory device has become stable. The power supply can be presumed stable after a particular number of clock pulses 330 have occurred since power-up or reset. In the case of an MMC memory device, this number of clock pulses 330 can be 74. Other memory devices may have a different number of clock pulses occurring prior to allowing the initiation of a boot operation according to the one or more embodiments of the present disclosure.

A boot operation can be initiated according to one or more embodiments of the present disclosure by the host 210 sending a particular command (e.g., base command or base command plus argument) to initiate a boot operation. As one example, in the case of an MMC memory device, the initiate boot command may be a CMD0 command having a unique argument 314-318 indicative of a desire to initiate the boot operating mode. The format of the initiate boot command (e.g., CMD0 with unique argument) under this protocol would adhere to the format shown in Table 1 above. The unique argument may comprise any unique value so long as the memory device recognizes that the CMD0 having the unique argument comprises an initiate boot command and not a generic CMD0 (e.g., simple reset) command. For example, the unique argument can consist of a hexadecimal value of 0xFFFFFFFA. The initiate boot command can also comprise CRC data while adhering to the format shown in Table 1. In general, the memory device is configured to recognize a pattern of two or more command signals as indicative of a desire to initiate a boot operating mode, and to initiate the boot operating mode in response to that pattern of two or more command signals.

Upon receipt of the initiate boot command 316 and end bit 318, the memory device 200 initiates a boot mode of operation if the memory device has been enabled as a boot enabled device. For example, multiple memory devices may be coupled to the command and data bus as shown in FIG. 2. Thus, a selected memory device can be boot enabled so only that device responds to an initiate boot command provided by the host 210. The boot enabled memory device may be configured to respond to a received initiate boot command with a boot acknowledge response presented on the DAT[0] signal as indicated by the dashed lines of 320. This can be desirable in systems utilizing multiple memory devices wherein the host may be 'polling' the multiple memory devices to determine which memory device responds to indicate that it is the boot enabled memory device. A system having a single memory device may or may not be configured to respond with a boot acknowledge response 320. According to one embodiment, the format of the boot acknowledge response may be a start (e.g., 0) bit followed by a '010' bit pattern followed by an end (e.g., 1) bit. For example, the boot acknowledge response 320 generated by the memory device 200 and presented on the DAT[0] signal line 308 can be a bit pattern of 00101. Other boot acknowledge bit patterns 320 are possible according to the various embodiments of the present disclosure. If configured to do so, the memory device may be required to output the boot acknowledge response 320 within a particular time frame following the receipt of an initiate boot command, as defined by the protocol under which the memory device is operating. For example, an MMC memory device configured to output a boot acknowledge response must output the boot acknowledge response within a time-out 'TO1' time of 50 ms 332 of receipt of the initiate boot command to avoid a time out condition. However, the many embodiments are not limited to the 50 ms response time. If the memory device is not configured to output a boot acknowledge response, a different time out condition may also occur if the beginning of the boot data 322 is not presented on the data line 308 by a different time-out time 'TO2' 334.

Following the output of a boot acknowledge response 320, if configured to do so, the memory device 200 then begins to output boot data 322-324 from the boot data locations of the memory device. The memory device may be configured to utilize one or more boot partitions of the memory device. For example, an MMC memory device may have two boot partitions available to boot from. The memory device 200 may also access the user area of the memory device to boot from. The area containing the boot data is designated in the memory device, i.e., the memory device is configured to define where it will look for boot data when the boot mode of operation is initiated. Thus, to initiate the boot mode of operation, no address need be provided to the memory device because the memory device controls where it will access the boot data. In the MMC memory device example, a minimum boot partition size may be 128 KB wherein the maximum boot partition size is determined by a boot partition size multiplier such that the actual boot partition size is equal to 128 KB*BOOT_PARTITION_MULTIPLIER. The boot partition multiplier value may have been stored previously in the memory device 200. The output of boot data is synchronized with the system clock 304 and continues until all data of the designated area has been outputted or the boot mode of operation has been terminated. The format of the boot data 322-328, 420-428 may be that of a start bit (e.g., 0) followed by a portion of boot data followed by an end (e.g., 1) bit as shown in FIGS. 3 and 4. If configured, the MMC memory device may also present boot data on data lines in addition to the DAT[0] line 308 such as the DAT[0]-DAT[n] data lines 310-312. For an MMC memory device, n may be any number up to 7 under current standards. Other memory devices according to the various embodiments are not so limited to 8 (e.g., DAT[0]-DAT[7]) data lines.

Termination of the boot load operation (e.g., the memory device exiting boot mode) according to embodiments of the present disclosure can occur when a valid terminate boot CMD0 command 414-418 is transmitted on the CMD bus 226 by the host 210. According to the MMC protocol, the boot operation will also be terminated if all of the contents of the enabled boot partition(s) have been sent to the host. However, in one or more embodiments, the boot operation can only be terminated prior to outputting the entire contents of the enabled boot partition(s) if a valid terminate boot command is received by the memory device. A terminate boot command may also adhere to the format as shown in Table 1. For example, the terminate boot command could also conform to the CMD0 command protocol. The argument of the terminate CMD0 command 414-418 can have any value as long as it differs from the unique argument used in conjunction with the initial CMD0 command 316 transmitted by the host 210 to initiate the boot operation. The host may send the terminate boot CMD0 command 416 while data 420-424 is still being output on the data bus lines 308-312. Output of data will cease in response to receipt 430 by the memory device 200 of the end bit 418 of the terminate boot command 416. Data 424-428 on the data lines 308-312 may or may not coincide precisely with the termination of the boot operation 430. In an alternative embodiment indicated by the dashed lines surrounding command 432, the terminate boot CMD0 command 432 may be sent by the host 210 while the data lines are idle. In this example, the memory device will again exit boot mode upon the receipt 434 of the end bit of the valid terminate boot CMD0 command 432. Thus the embodiments of the present disclosure provide for a more robust method of initiating and terminating a boot operation than previous methods provide. For example, a noise glitch appearing on the command line in a system utilizing methods according to one or more embodiments of the present disclosure will not trigger a premature termination of the boot operation because only a valid terminate boot command will cause the memory device to exit boot mode.

CONCLUSION

Memory devices and methods have been described capable of providing a more robust boot loading method. By utilizing a command indicative of a desire to initiate a boot operation and a command indicative of a desire to terminate the boot operation according to the one or more embodiments of the present disclosure, a more reliable boot operation can be realized. The need for hardware modification to some hosts has also been eliminated.

Although specific embodiments have been illustrated and described herein, it will be appreciated by those of ordinary skill in the art that any arrangement that is calculated to achieve the same purpose may be substituted for the specific embodiments shown. Many adaptations of the disclosure will be apparent to those of ordinary skill in the art. Accordingly, this application is intended to cover any adaptations or variations of the disclosure.

What is claimed is:
1. A method of operating a memory device, comprising:
  receiving a first command indicative of a desire to initiate a boot mode of operation of the memory device, wherein the first command comprises a pattern of two or more command signals;
  initiating the boot mode of operation in response to receiving the first command;
  outputting data from an area designated in the memory device for storage of boot data after initiating the boot mode of operation;
  receiving a second command indicative of a desire to terminate the boot mode of operation of the memory device, wherein the second command comprises a pattern of two or more command signals; and
terminating the boot mode of operation in response to receiving the second command.

2. The method of claim 1 wherein the first command comprises a first portion and a second portion, the second command comprises a first portion and a second portion, the first portion of each command is the same, and the second portion of each command is different.

3. The method of claim 2 wherein terminating the boot mode of operation in response to receiving the second command comprises terminating the boot mode of operation in response to receiving the second command if the second portion of the second command is any pattern of command signals different from a pattern of command signals making up the second portion of the first command.

4. The method of claim 2 wherein each of the first command and the second command further comprises a cyclic redundancy check data portion.

5. The method of claim 1 wherein terminating the boot mode of operation in response to receiving the second command comprises terminating output of the data from the area designated in the memory device for storage of the boot data.

6. The method of claim 1 wherein the first command and the second command each conform to an MMC protocol for a CMD0 command.

7. The method of claim 1 wherein the boot operating mode comprises generating an ongoing output of data from the area designated for storage of boot data until all data from the designated area is outputted or the boot operating mode is terminated.

8. The method of claim 7 wherein the area designated for storage of boot data includes a user area of the memory device.

9. The method of claim 7 further comprising generating the ongoing output of data synchronized to a clock signal applied to the memory device.

10. A method for operating a memory device, comprising:
initiating a boot mode of operation in the memory device in response to receiving a first command indicative of a desire to initiate the boot mode of operation, wherein the first command comprises a particular command combined with a first argument; and
terminating the boot mode of operation in the memory device in response to receiving a second command, wherein the second command comprises the particular command combined with a second argument different than the first argument.

11. The method of claim 10 further comprising, in response to initiating the boot mode of operation, outputting the boot data from an area designated in the memory device for storage of boot data.

12. The method of claim 11 further comprising continuing to output the boot data until all data from the designated area has been output or the boot mode of operation has been terminated.

13. A method for operating an electronic system having a host in communication with a memory device, comprising:
transmitting a first command from the host to the memory device indicative of a desire to output boot data stored in the memory device, wherein the first command comprises a particular command combined with a first argument; and
if it is desired to terminate the output of the boot data, transmitting a second command to the memory device, wherein the second command comprises the particular command combined with an argument different from the first argument.

14. The method of claim 13 further comprising waiting for a power supply to become stable after a power-up or reset of the host before transmitting the first command.

15. The method of claim 14 wherein waiting for the power supply to become stable comprises waiting for a particular number of clock pulses of a system clock of the host.

16. The method of claim 13 further comprising transmitting an acknowledgement from the memory device prior to outputting the boot data.

17. A memory device, comprising:
an array of memory cells comprising a plurality of non-volatile memory cells; and
control circuitry configured to receive a plurality of commands, to enter a boot mode of operation in response to receiving a first command comprising a pattern of two or more command signals indicative of a desire to enter the boot mode of operation, and to terminate the boot mode of operation in response to receiving a second command comprising a pattern of two or more command signals indicative of a desire to terminate the boot mode of operation;
wherein the first command and the second command each comprise a first portion and a second portion;
wherein the first portion of the first command is the same as the first portion of the second command; and
wherein the second portion of the second command is different than the second portion of the first command.

18. The memory device of claim 17 wherein the array of non-volatile memory cells are flash memory cells.

19. The memory device of claim 17 wherein the memory device is an MMC memory device.

20. The memory device of claim 19 wherein the first command and the second command each conform to a CMD0 command in an MMC protocol.

21. An electronic system, comprising:
a host for generating a plurality of memory device commands, wherein the plurality of memory device commands comprises an initiate boot command and a terminate boot command; and
a memory device coupled to the host wherein the memory device is adapted to receive the memory device commands, the memory device comprising:
an array of memory cells wherein the array of memory cells includes an area designated in the memory device to store boot data; and
control circuitry configured to output boot data stored in the designated area of the array of memory cells in response to a received initiate boot command and to terminate output of boot data stored in the designated area of the array of memory cells in response to a received terminate boot command;
wherein the initiate boot command comprises a particular command combined with a first argument; and
wherein the terminate boot command comprises the particular command combined with a second argument different than the first argument.

22. The system of claim 21 wherein the host is configured to generate the initiate boot command following the occurrence of a particular number of clock pulses generated by the system clock after a power-up or reset of the processor.

23. The system of claim 21 wherein the control circuitry is further configured to output an acknowledgement to the processor in response to a received initiate boot command and prior to the output of boot data.

24. The system of claim 21 wherein the memory device is a boot enabled device.

* * * * *